(12) United States Patent
Talon et al.

(10) Patent No.: US 9,301,640 B2
(45) Date of Patent: Apr. 5, 2016

(54) BEVERAGE PREPARATION MACHINE (71) Applicant: NESTEC S.A., Vevey (CH)

(72) Inventors: Christian Talon, Vufflens-le-Chateau (CH); Pierre Struzka, Lausanne (CH)

(73) Assignee: Nestec S.A., Vevey (CH)

( * ) Notice: Subject to any disclaimer, the term of this patent is extended or adjusted under 35 U.S.C. 154(b) by 204 days.

(21) Appl. No.: 14/361,449

(22) PCT Filed: Nov. 22, 2012

(86) PCT No.: PCT/EP2012/073290
§ 371 (c)(1),
(2) Date: May 29, 2014

(87) PCT Pub. No.: WO2013/079384
PCT Pub. Date: Jun. 6, 2013

(65) Prior Publication Data
US 2014/0318381 A1  Oct. 30, 2014

(30) Foreign Application Priority Data
Dec. 1, 2011 (EP) ..................................... 11191615

(51) Int. Cl.
*A47J 31/06* (2006.01)
*A47J 31/44* (2006.01)
(Continued)

(52) U.S. Cl.
CPC ............ *A47J 31/4492* (2013.01); *A47J 31/407* (2013.01); *A47J 31/4482* (2013.01); *A47J 31/46* (2013.01)

(58) Field of Classification Search
CPC . A47J 31/407; A47J 31/4482; A47J 31/4492; A47J 31/46
USPC ........ 99/280, 283, 284, 285, 295, 299, 323.3; 426/77, 115, 433
See application file for complete search history.

(56) References Cited

U.S. PATENT DOCUMENTS 7,337,704 B2 * 3/2008 Hammad ............... A47J 31/545
99/281
7,681,491 B2 * 3/2010 Agon .................... A47J 31/061
99/293
(Continued)

FOREIGN PATENT DOCUMENTS

EP          1656863       5/2006
WO       2006127108     11/2006

OTHER PUBLICATIONS

International Search Report corresponding to related International Patent Application No. PCT/EP2012/073290 mailed Jan. 14, 2013.
(Continued)

*Primary Examiner* — Dana Ross
*Assistant Examiner* — Lindsey C Teaters
(74) *Attorney, Agent, or Firm* — K&L Gates LLP (57) ABSTRACT

The present invention relates to a beverage preparation machine (1) with a machine body (2) and a machine dispensing head (3), characterized in that said dispensing head (3) and machine body (2) comprise cooperating means (12, 13, 14, 15, 16, 17, 18, 19, 20, 21, $g_{hd}$, $g_{mb}$, $g_{il}$, $c_{mb}$) that allow movement of said head (3) relative to said body (2) along a non-linear path, and such that the trim of the dispensing head (3) is constant whatever its position.

6 Claims, 10 Drawing Sheets

(51) Int. Cl.
*A47J 31/40* (2006.01)
*A47J 31/46* (2006.01)

(56) References Cited

U.S. PATENT DOCUMENTS 7,739,946 B2 * 6/2010 Ruckstuhl ........... A47J 31/0647
99/289 R
2010/0147091 A1 * 6/2010 Buttiker .............. A47J 31/3614
74/89.32
2010/0275787 A1 * 11/2010 Bonacci .............. A47J 31/3676
99/295

OTHER PUBLICATIONS

International Written Opinion corresponding to related International Patent Application No. PCT/EP2012/073290 mailed Jan. 14, 2013.

* cited by examiner

BEVERAGE PREPARATION MACHINE

CROSS REFERENCE TO RELATED APPLICATIONS

The present application is a National Stage of International Application No. PCT/EP2012/073290, filed on Nov. 22, 2012, which claims priority to European Patent Application No. 11191615.1, filed Dec. 1, 2011, the entire contents of which are being incorporated herein by reference.

FIELD OF THE INVENTION

The present invention concerns a beverage preparation machine, particularly a machine for in-home consumption, wherein the dispensing head of the machine is movable to adapt its distance to a cup placed hereunder, depending on the cup size.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working a rigid capsule.

The machine comprises a body and dispensing head attached to said body. The dispensing head comprises a receptacle for accommodating said capsule. A fluid injection system is disposed inside the machine head, for injecting a fluid—preferably water—under pressure into said capsule. Water injected under pressure in the capsule, for the preparation of a coffee beverage according to the present invention, is preferably hot, that is to say at a temperature above 70° C. However, in some particular instances, it might also be at ambient temperature. The pressure inside the capsule chamber during extraction and/or dissolution of the capsule contents is typically about 1 to 6 bar for dissolution products, 2 to 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee within a few seconds.

The principle of extracting, infusing, and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. Fluid tank, heating element, pump element, are usually located within the machine body, and are linked to the dispensing head with a fluid circuit.

The way the water circulates within the machine is selected via a selecting valve means, such as for instance a peristaltic valve of the type described in applicant's European patent application EP 2162653 A1.

When the beverage to be prepared is coffee, one interesting way to prepare the said coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the said capsule, for retaining the internal pressure in the chamber, the said membrane being associated with piercing means for piercing dispensing holes in the said aluminum membrane when said internal pressure inside the chamber reaches a certain predetermined value,
- optionally, means configured to break the jet of fluid so as to reduce the speed of the jet of fluid injected into the capsule and distribute the fluid across the bed of substance at a reduced speed.

Beverage preparation machines and capsules as described above, for many of them, are designed to give the consumer the choice of preparing the beverage he likes amongst a whole range of beverage products.

In the range of beverages that is proposed to the consumer, some correspond to large cups typically having a volume of 200 ml or above, for instance Caffee Crema Grande, latte macchiatos, cappuccinos, chococinos, American brew-like coffees, or the like. Some other beverages correspond to mid-size cups typically between 100 and 200 ml, like for instance teas, herbal infusions, Chai tea, tea latte, or chocolate-based preparations such as Nesquik®. Finally, some correspond to small serving size, typically below 100 ml, such as for instance espressos, ristretto, or cortado coffee.

Due to the fact that the range of product recipes can be wide, that is available for preparation with the same type of machine, and the therefore that the volume to be dispensed can vary from one beverage to another, a constant issue with known machines is that the distance between the cup tray (or drip tray) and the beverage dispensing outlet of the extraction head is often not adapted to the cup size that is chosen by the consumer. Particularly, this distance is often too large. As a result, beverage liquid may splash during dispensing, which is of course undesirable. In order to solve the splashing issue, most machines are equipped with a cup/drip tray that is adjustable in height. Height position of the tray may be continuous, or be a step-by-step mechanism. However, in all known systems, handling and setting of the cup tray is uneasy, and certainly, user-friendliness of such systems can be improved. Moreover cup trays which are adjustable in height often show stability problems, which is of course undesirable.

WO 2006/127108 A2 discloses an extraction head that is movable relative to the cup tray. The movement of the dispensing head is performed along a linear, vertical axis of the machine body. Guiding means allow to keep the movement along a straight direction. While the machine disclosed in this application contains interesting features, the movement of the dispensing head is limited to a single degree of liberty, i.e. to a vertical, up and down movement.

However, one essential requirement in beverage preparation machines, and particularly if the dispensing head is movable relative to the machine body, is that leakage be prevented in the dispensing head during injection of water, as well as backflow splashing of liquid present in the capsule after dispensing. Backflow is well disclosed in applicant's European patent EP 1967100 B1, wherein a system is described and claimed, that was developed to ensure that backflow does not occur, and that the capsule is positioned at a certain predetermined angle relative to the injection system of the machine. This prevents that liquid level in the capsule during or after beverage preparation be such as to be in contact with the zone of the capsule's top membrane which is pierced by the fluid injection system of the machine, which would create a sucking effect and therefore a backflow when said capsule still contains pressurized liquid and the fluid injection system is removed from the top membrane.

There is a need for a beverage preparation machine comprising a dispensing head with beverage outlet that is movable relative to the machine body along a non-linear path, while guaranteeing that no backflow or leakage occurs, whatever the position of the dispensing head.

SUMMARY OF THE INVENTION

The need mentioned above is met with the present invention, with a beverage preparation machine with a machine body and a machine dispensing head, said head comprising means for dispensing said beverage into a container placed herebelow, characterized in that said dispensing head and machine body comprise cooperating means that allow movement of said head relative to said body along a non-linear path, and such that the trim of the dispensing head is constant whatever its position.

By "trim", it is meant the combination of pitch and roll angles of the dispensing head. More precisely, the pitch angle of the machine head is defined as the tilting angle along an horizontal transversal (i.e. left to right) axis, whereas the roll angle is a tilting angle along an horizontal longitudinal (i.e. front to back) axis.

Preferably the dispensing head of the beverage preparation machine according to the invention is a brewing head. A brewing head is defined as a portion of the machine that is able to hold the capsule and withstand the preparation conditions such as pressure during beverage preparation. The brewing head also comprises the fluid (e.g. water) injection means such as a needle for instance.

The present invention ensures that whatever the position of the dispensing head relative to the machine body, the tilting angle of said head and therefore of the capsule inserted therein, is kept constant and such that the side of the capsule top membrane which has been pierced by the water injection means (e.g. water injection needle) as described hereinabove, is at sufficient a distance from the liquid contained inside the capsule. This ensures that no backflow occurs by pressurized liquid flowing through the fluid injection hole that has been pierced in the top membrane.

More generally, the stable and constant trim of the dispensing head of the machine whatever its position relative to the machine body, ensures that no leakage can occur during or after the beverage preparation, as it would happen in case the capsule is tilted.

In a highly preferred embodiment of the present invention, the movement of the machine head relative to the machine body follows an arc segment.

According to the invention, the cooperating means comprise cooperating gears. A gear is a rotating machine part, having preferably cut teeth or cogs which mesh with another toothed part in order to transmit torque. Two or more gears working in tandem are called a transmission.

Said gears comprise at least a movable gear wheel of the dispensing head $g_{hd}$, a stationary gear wheel of the machine body $g_{mb}$, and a movable intermediate linking gear wheel $g_{il}$, the centres of which are positioned on a lever element which is rotationally movable around the central axis $c_{mb}$ of the machine gear wheel $g_{mb}$, and wherein said at least three gear wheels have identical gear wheel modules, and the pitch diameters of the dispensing head and machine body gear wheels $g_{hd}$, $g_{mb}$, are identical.

Preferably, the lever element forms at least part of the machine outer casing.

Advantageously, the beverage preparation machine of the invention comprises coding means associated with different positions of the dispensing head, said machine further comprising sensing means for sensing said coding means, said sensing means being associated with a machine processor for setting a beverage dispensing volume value that depends on the position of said dispensing head.

Preferably, said machine processor is suitable for setting at least one other beverage preparation parameter selected within the list of: dispensed beverage temperature, beverage preparation pressure, beverage preparation time, cleaning of the machine dispensing head, or a combination thereof.

In a highly preferred embodiment of the invention:

(i) said coding means are selected within the list of: colour surfaces, barcodes, recessed or protruding elements, RFID chips, magnetic surfaces, printed characters, and (ii) said sensing means are selected within the corresponding list of: colour sensors, barcode readers or linear CCD readers, mechanical switches or tactile sensors, RFID sensors, magnetic sensors or switches, CCD camera.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
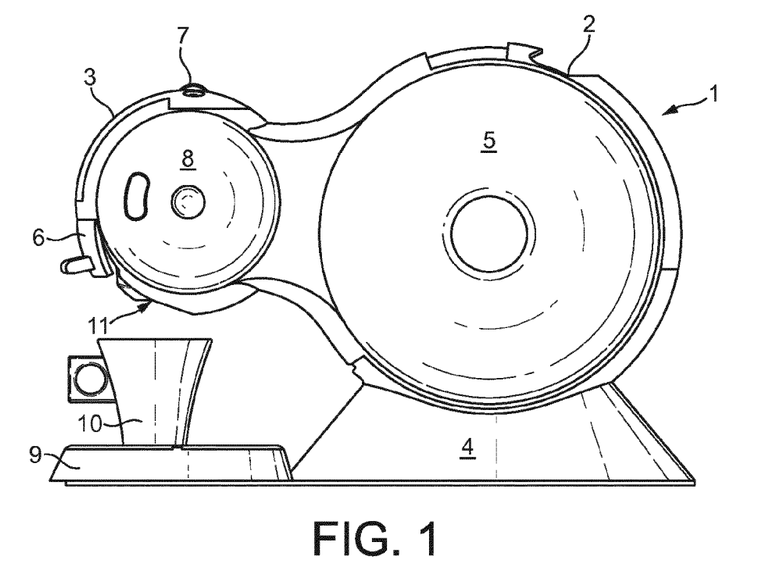
FIG. 1 is a profile view of a machine according to the invention wherein the dispensing head is in a position for dispensing a small cup volume of beverage.
Figure 2:
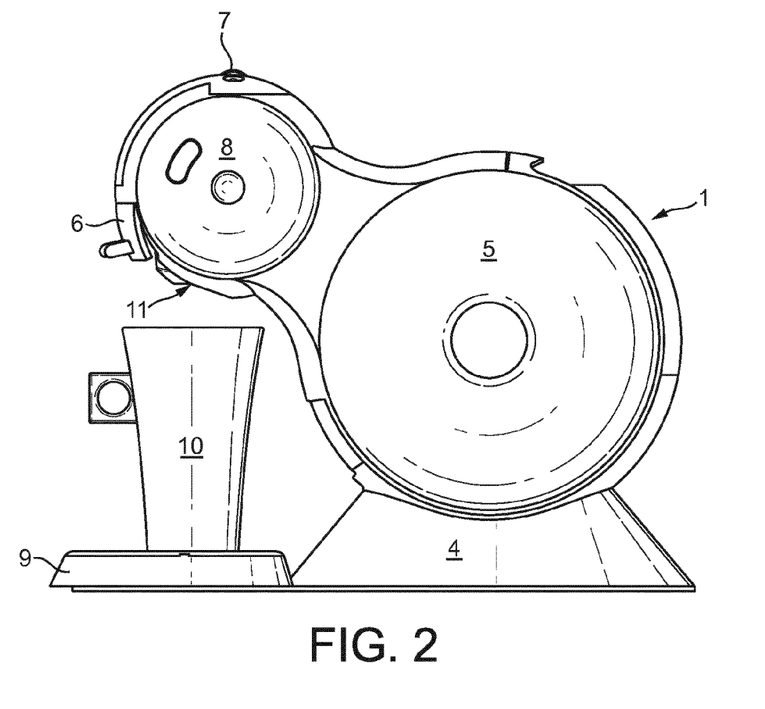
FIG. 2 is a profile view of a machine according to the invention wherein the dispensing head is in a position for dispensing a large cup volume of beverage.

A beverage preparation machine 1 according to the invention is illustrated in FIG. 1 and FIG. 2. It comprises a machine body 2 and dispensing head 3.

The machine body contains functional elements of the machine (not shown in the drawing) such as a fluid reservoir, a fluid pump, a fluid heating element, a fluid pipe system, a fluid valve system for conveying the extraction fluid from the reservoir to the dispensing head, through the pump and optionally through the heating element. It further contains a control board for controlling electronically the beverage preparation parameters in relation to the control panel actuated by the user. Advantageously, the body of the machine also comprises a stand 4, for ensuring that the machine body is stationary and stable when said machine stands on a surface. The machine body 2 is covered by an outer casing 5 which protects the functional parts of the machine.

The dispensing head 3 is located in the front part of the machine as illustrated in FIGS. 1 and 2. The dispensing head 3 comprises functional elements of the machine such as a portion of the fluid pipe system already described above, a fluid injection device such as a needle (not shown in the drawing). It further comprises a capsule holding element, such as a removable capsule holder 6. The dispensing head, and in particular the capsule holder and the fluid injection system are constructed such that a capsule inserted therein can withstand an internal pressure of at least 5 bars, preferably at least 10 bars without being damaged. The walls of the capsule holder in particular are sufficient resistant to withstand that pressure. Moreover, the fluid injection needle is supported by a needle-supporting plate which cooperates with the capsule holder when the machine is in its functional configuration, such that it encloses and holds a capsule inserted therein during a beverage preparation.

The dispensing head is normally constructed such that in the functional configuration of the machine, the capsule inserted therein is tilted such that its top membrane slightly faces the back of the machine, with an angle which is about 6° relative to the horizontal plane.

The dispensing head 3 further comprises a control panel 7, which is used by the user to set beverage preparation parameters, and start or stop a beverage preparation. In the embodiment represented in the drawing, the control panel 7 comprises a beverage preparation volume display and a rotary wheel selector, of the type disclosed in applicant's prior application no EP AN 11167716.7. The dispensing head also comprises a casing 8 which protects the functional elements contained therein.

The machine comprises a cup tray 9 for supporting a cup 10 into which the beverage is dispensed from the dispensing head 3. The cup tray is functionally stationary in order to guarantee its stability. In some cases, the cup tray can be made removable so that it is easier to clean.

According to the invention, the machine head 3 is movable relative to the stationary body 2. More precisely, the head's height can be adjusted manually by the user, or alternatively, the head's height is adjusted automatically by detection of the type of cup which is placed onto the cup tray. FIG. 1 represents a machine according to the invention wherein the dispensing head is in a lowered configuration, such that the dispensing outlet 11 of a capsule inserted therein (or alternatively, the dispensing outlet of the capsule holder), is at a short distance from the upper edge of a cup 10 disposed herebelow; in this case, the cup is a small volume cup, for instance an espresso or ristretto cup. In FIG. 2, the same machine is represented with the dispensing head in its uppermost position, such as to adapt to a large volume cup disposed herebelow; in this case, the cup corresponds to beverages preparation having a volume of more than 200 ml, such as for instance latte macchiato, cappuccino, or Caffè Grande (brew-like coffee). In order to guarantee that the trim of the dispensing head (and therefore the trim of the capsule inserted therein) is constant whatever the height position of the dispensing head, said dispensing head and machine body comprise cooperating means that allow movement of said head relative to said body along a non-linear path, and such that the trim of the dispensing head is constant whatever its position. Various embodiments of such cooperating means will now be described in reference to the drawing.

In all of the embodiments described hereafter, it is considered that the extraction/dissolution fluid that is used for prepare a beverage, is water.

A first embodiment of a machine according to the present invention is illustrated in FIGS. 3, 4, 5 and 6.

Figure 3:
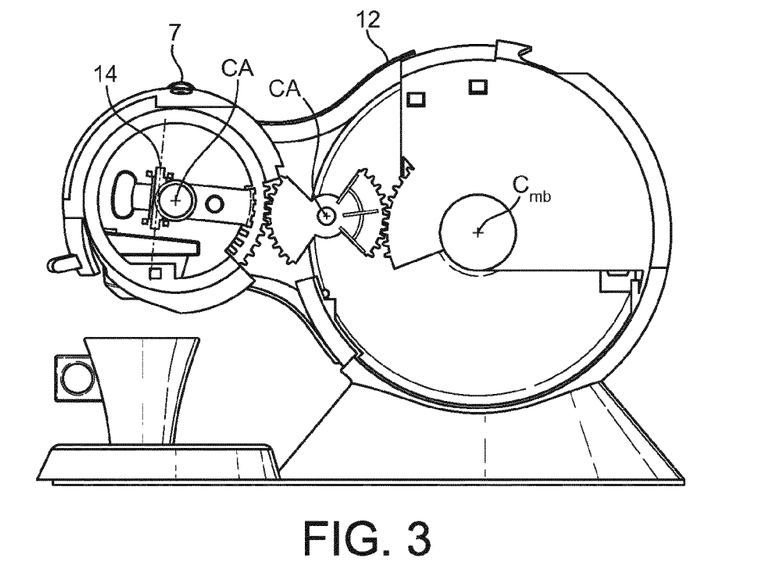
FIG. 3 is a partially cut profile view of a machine similar to FIG. 1.
Figure 4:
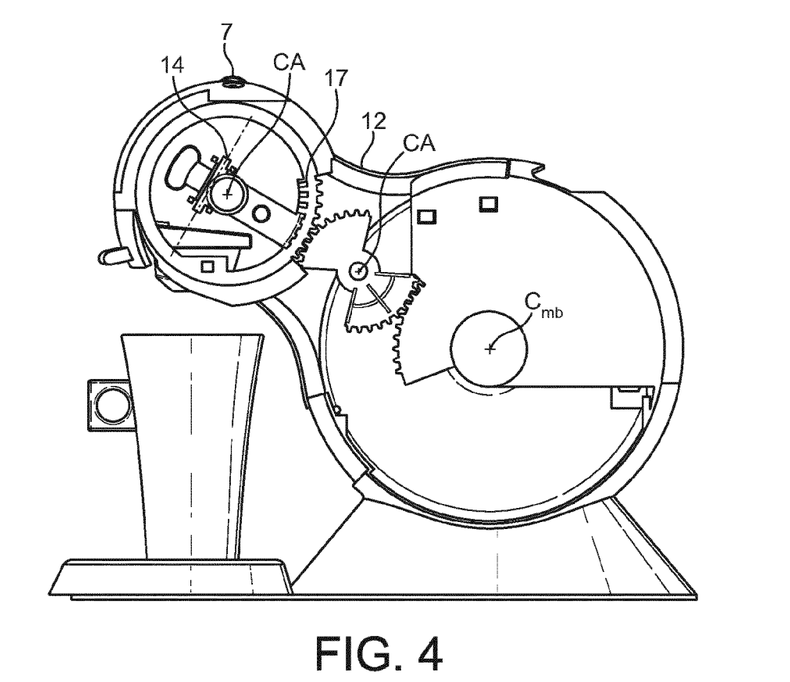
FIG. 4 is a partially cut profile view of a machine similar to FIG. 2.

In this embodiment, the cooperating means of the dispensing head 3 and machine body 2, is made of teethed gear wheels as illustrated in FIG. 3 and FIG. 4.

Said gear wheels comprise a movable gear wheel of the dispensing head $g_{hd}$, a stationary gear wheel of the machine body $g_{mb}$, the centres of which are positioned on a lever element which is rotationally movable around the central axis $c_{mb}$ of the machine gear wheel $g_{mb}$, and a movable intermediate linking gear wheel $g_{il}$. By "movable", it is meant that the gear wheels can rotate around their respective centre axis CA.

Figure 5:
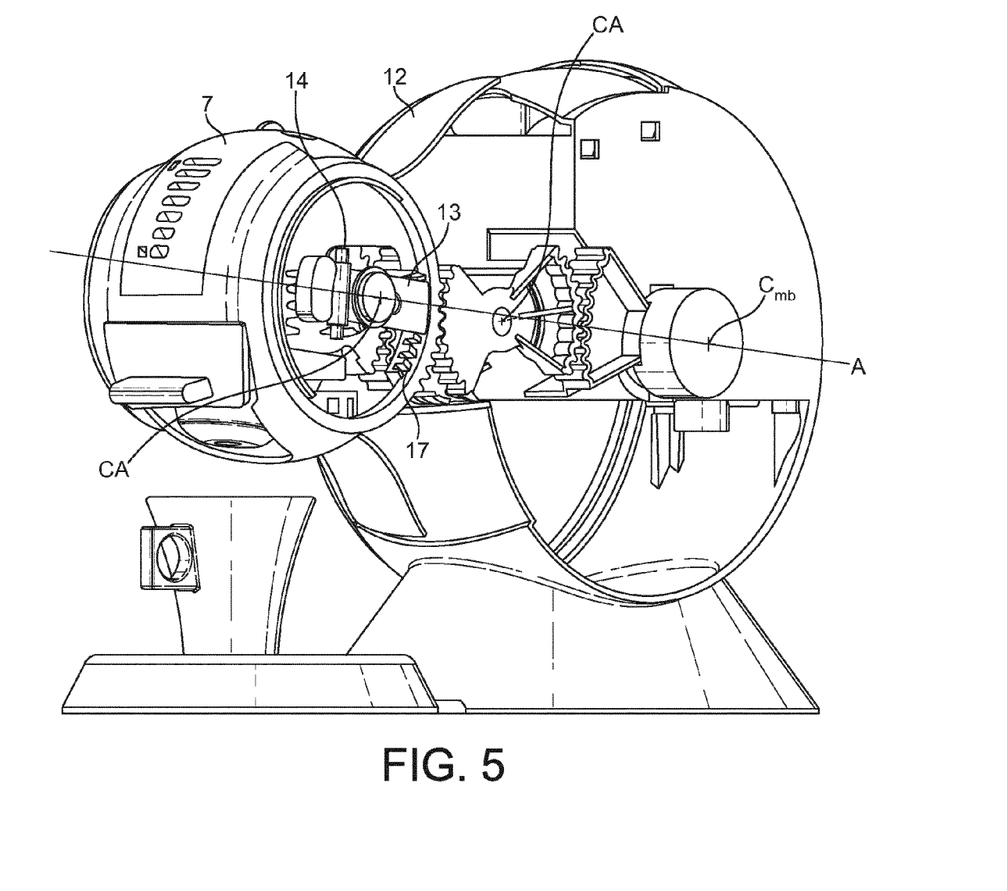
FIG. 5 is a partially cut perspective view of a machine similar to FIG. 3.
Figure 6:
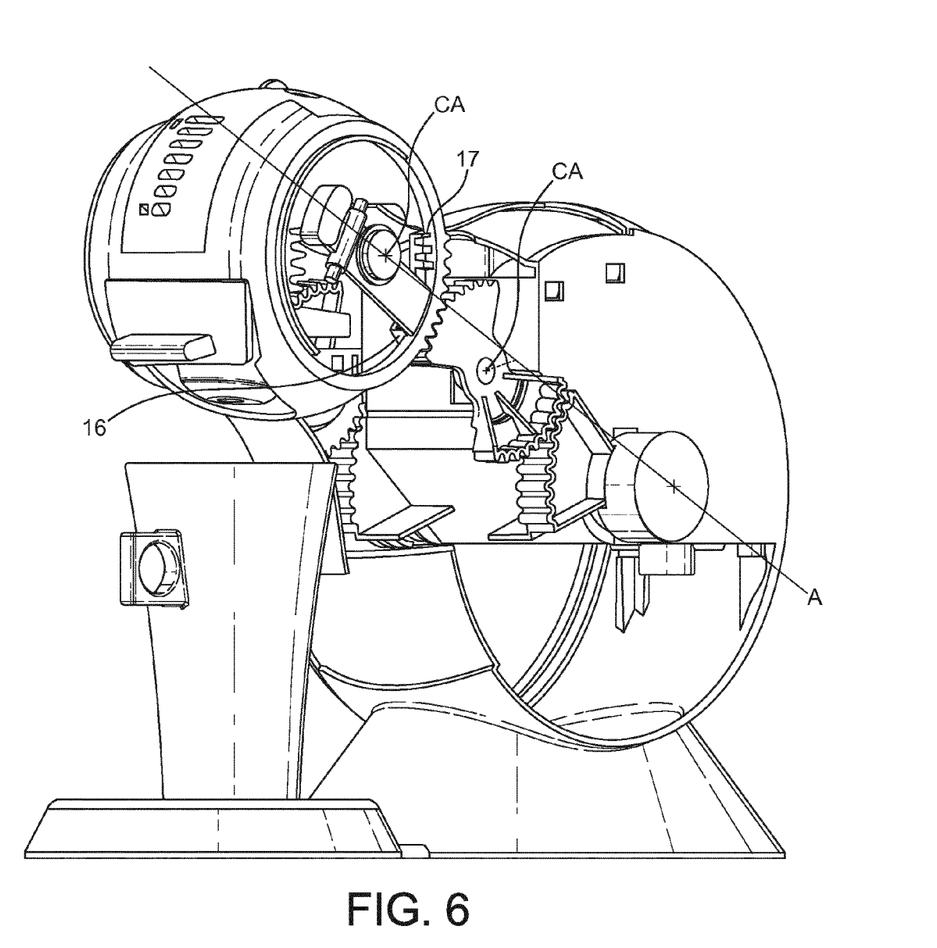
FIG. 6 is a partially cut perspective view of a machine similar to FIG. 4.

In the present embodiment, the lever element 12 is such that it also makes part of the machine and dispensing head casing, as illustrated in FIGS. 3, 4 and especially in FIGS. 5 and 6.

In order to guarantee a constant trim of the brewing head, the following conditions must be met simultaneously.

First, it is mandatory that all gear wheels have a same module. The module m is the ratio of the gear wheel pitch diameter d, to the number z of teeth of the same gear wheel:

$$m = \frac{d}{z}$$

Second, the gear wheel of the dispensing head and that of the machine body $g_{hd}$, $g_{mb}$, must have the same pitch diameter. Although the module of the linking gear wheel must be equivalent to the module of the two other gear wheels, its pitch diameter can be chosen freely, and it will only depend from the machine dimensions. The gear wheels in this system do not need to be complete circular wheels, and can be portions of circles, as illustrated for instance in FIGS. 5 and 6.

In order to keep the position of the dispensing head in a stable position, a locking mechanism is provided which links the lever element 12 to the dispensing head structure. The locking mechanism comprises a pivotable locking lever 13 having a pivot axis 14—as shown in FIG. 5—, said axis 14 being pivotally mounted onto the lever element 12. The locking lever 14 comprises at one of its ends a press-button portion 15 which is accessible from outside of the dispensing head casing 8, and at its other end, a series of protrusions 16 which cooperate with corresponding grooves 17 disposed in the dispensing head structure. A spring-like element (not shown in the drawing) normally forces the pivotable locking lever 13 in a position where the protrusions and grooves interlock to prevent movement of the dispensing head. In order to modify the position of the dispensing head, the user has to press the press button 15 and move the dispensing head up or down. By releasing the pressure on press button 15, the locking lever 13 moves back automatically to the locking position.

By moving the dispensing head 3 up or down relative to the stationary machine body 2, the movement of the head follows an arc of a circle, the centre of which corresponds to the centre $c_{mb}$ of the machine body gear wheel. In all positions of the head, the trim of said head is kept the same.

Figure 7:
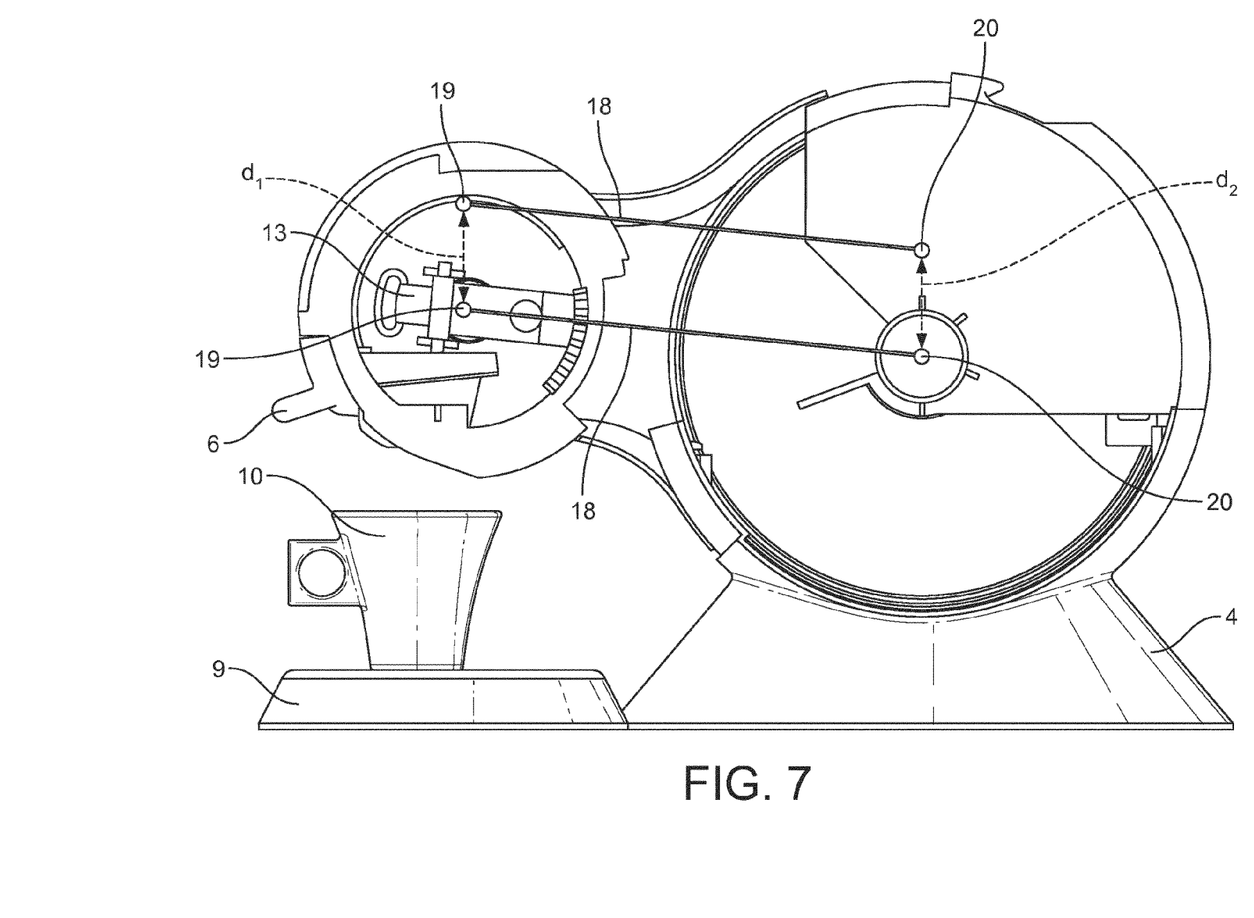
FIG. 7 is a profile partially cut view of an alternative embodiment to the invention wherein the dispensing head is in a position for dispensing a small cup volume of beverage.
Figure 8:
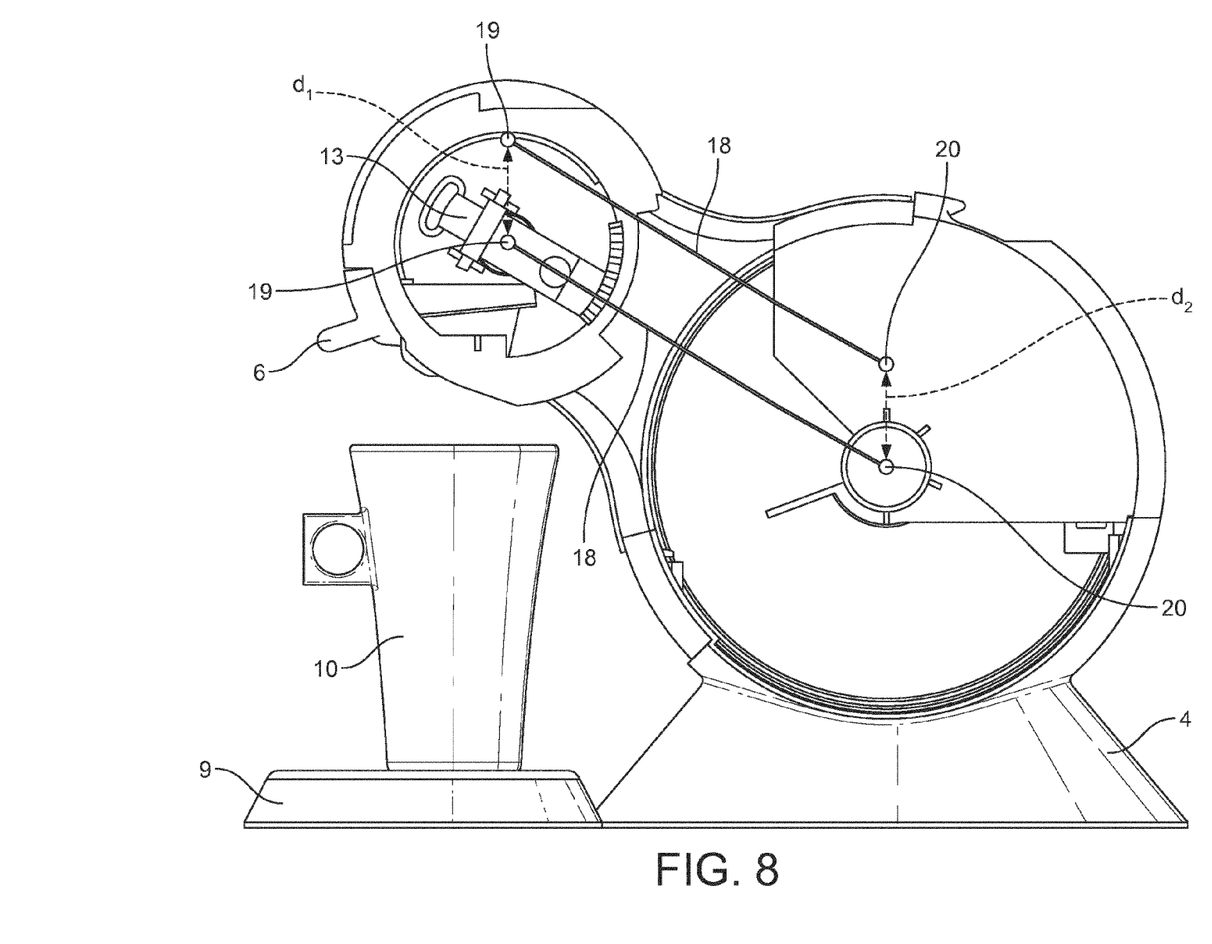
FIG. 8 is a profile partially cut view of an embodiment of a machine similar to FIG. 7 wherein the head is in a position for dispensing a small cup volume of beverage.

In an alternative embodiment to the present invention, the gear system could be replaced by a so-called <<parallelogram>> construction, which is illustrated in FIGS. 7 and 8.

More precisely, in this embodiment the cooperating means comprise so-called "parallelogram" with two parallel arms 18 having the same length. Each arm has one end pivotally fixed to the machine body, and the opposite end pivotally fixed to the dispensing head, such that the distance $d_1$ between the fixing points in the dispensing head is equal to the distance $d_2$ between the fixing points in the machine body, and both distances are constant whatever the position of the dispensing head, as illustrated in FIGS. 7 and 8. All fixing points 19 and 20 are points which are stationary relative to the structure of the machine, but functionally, they are pivot axes for the arms 18. The arms 18 can be made of plastic or metal, or any other rigid, non deformable material.

This embodiment can further comprise a locking system with e.g. a pivotable locking lever 13 to lock the height position of the dispensing head, as already described hereinabove with reference to the first embodiment of the invention.

In a third embodiment of the invention illustrated in FIGS. 9A to 12, the dispensing head of the machine is movable relative to the machine body 2 along an arc segment which is directed laterally (and not longitudinally as in the two previous embodiments). This alternative possibility to move the dispensing head laterally is particularly well illustrated in FIGS. 9B, 10B, 11B and in FIG. 12.

In this embodiment, the cooperating means for adjusting the position of the dispensing head 3 relative to the machine body 2 comprises cooperating gear wheels as described above in relation to the first embodiment. Especially, the gear wheels comprise:

a movable gear wheel of the dispensing head $g_{hd}$, and a stationary gear wheel of the machine body $g_{mb}$, the centres of which are positioned on a lever element which is rotationally movable around the central axis $c_{mb}$ of the machine gear wheel $g_{mb}$, and a movable intermediate linking gear wheel $g_{il}$.

The gear wheel $g_{mb}$ of the machine body is fixed in translation and rotation, and more particularly it is fixed onto the machine body structure.

The intermediate gear wheel is fixed to an intermediate linking collar 21 which links and is positioned in between the dispensing head casing 8 and the casing of the machine body 5. The collar 21 is mounted between casings 5 and 8 such that is movable rotationally relative to said casings 5 and 8.

Figure 12:
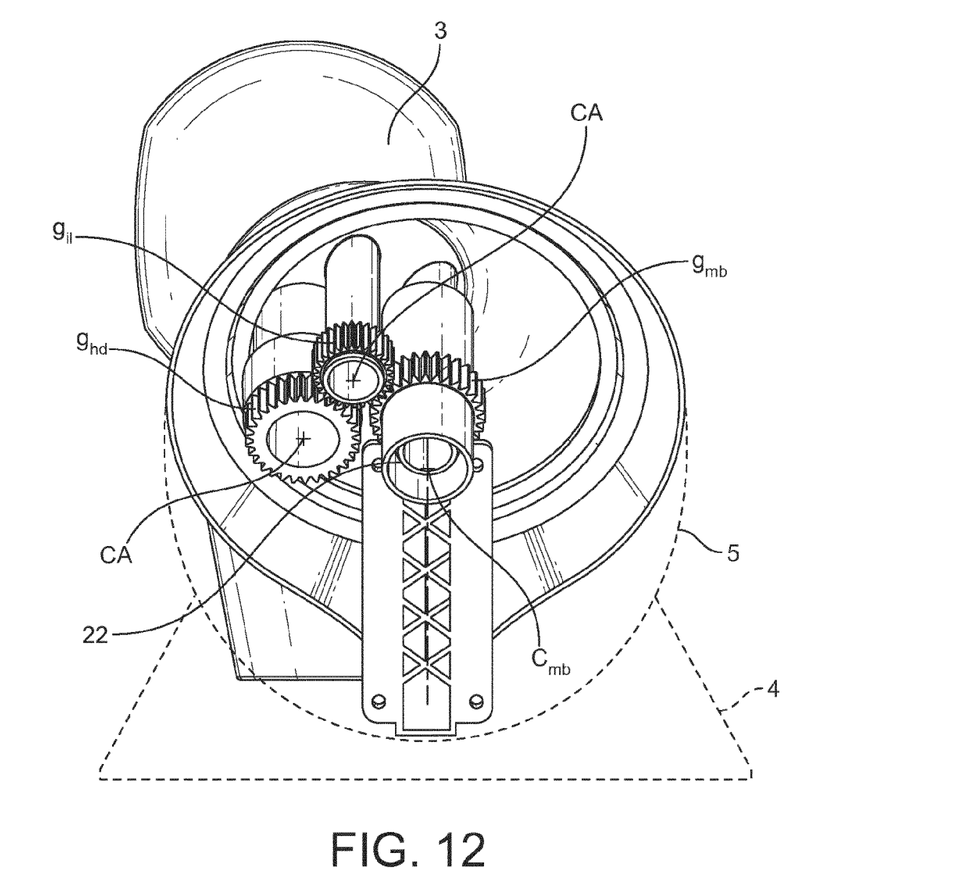
FIG. 12 is a rear partial view of a machine according to the embodiment illustrated in FIGS. 10A to 10C.

As illustrated in FIG. 12, the gear wheel of the machine body $g_{mb}$ is hollow. Through that gear wheel $g_{mb}$, a cylindrical tube 22 links the interior of the machine body 2 to the interior of the dispensing head 3. The different fluid pipes of the machine fluid circuit pass through the tube 22, in order to convey the fluid from the reservoir, pump and optionally through the heating element, contained in the machine body, towards the fluid injection system and into the capsule contained inside the dispensing head 3.

Figure 9A:
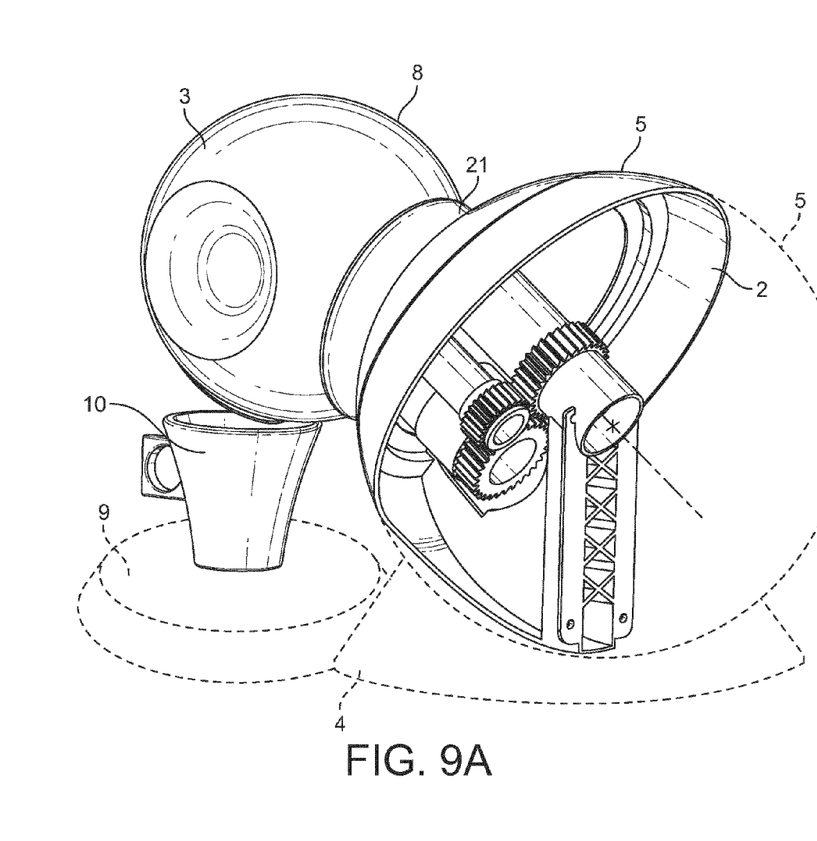
FIG. 9A is a partial perspective view of an embodiment of a machine wherein the head is in a position for dispensing a small cup volume of beverage.
Figure 9B:
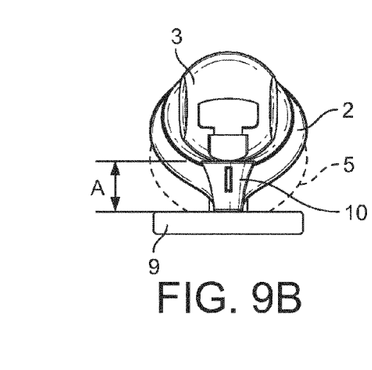
FIG. 9B is a partial front view of a machine similar to FIG. 9A.
Figure 9C:
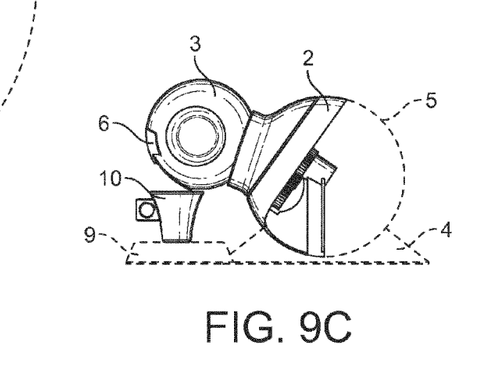
FIG. 9C is a partial side view of a machine similar to FIGS. 9A and 9B.
Figures 10A, 10B, 10C:
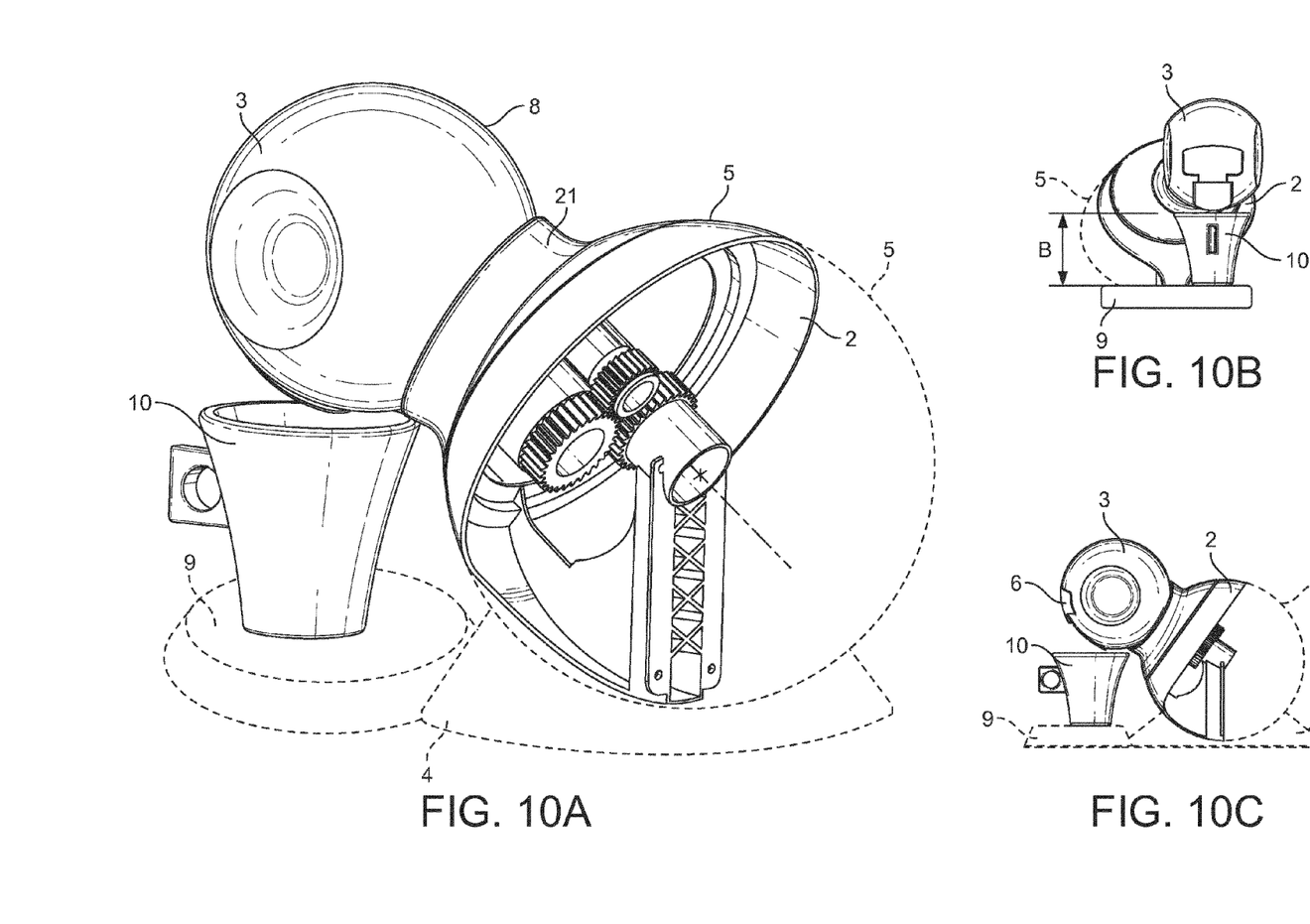
FIG. 10A is a partial perspective view of the embodiment shown in FIGS. 9A to 9C, wherein the head is in a position for dispensing a medium cup volume of beverage.
FIG. 10B is a partial front view of a machine similar to FIG. 10A.
FIG. 10C is a partial side view of a machine similar to FIGS. 10A and 10B.
Figures 11A, 11B, 11C:
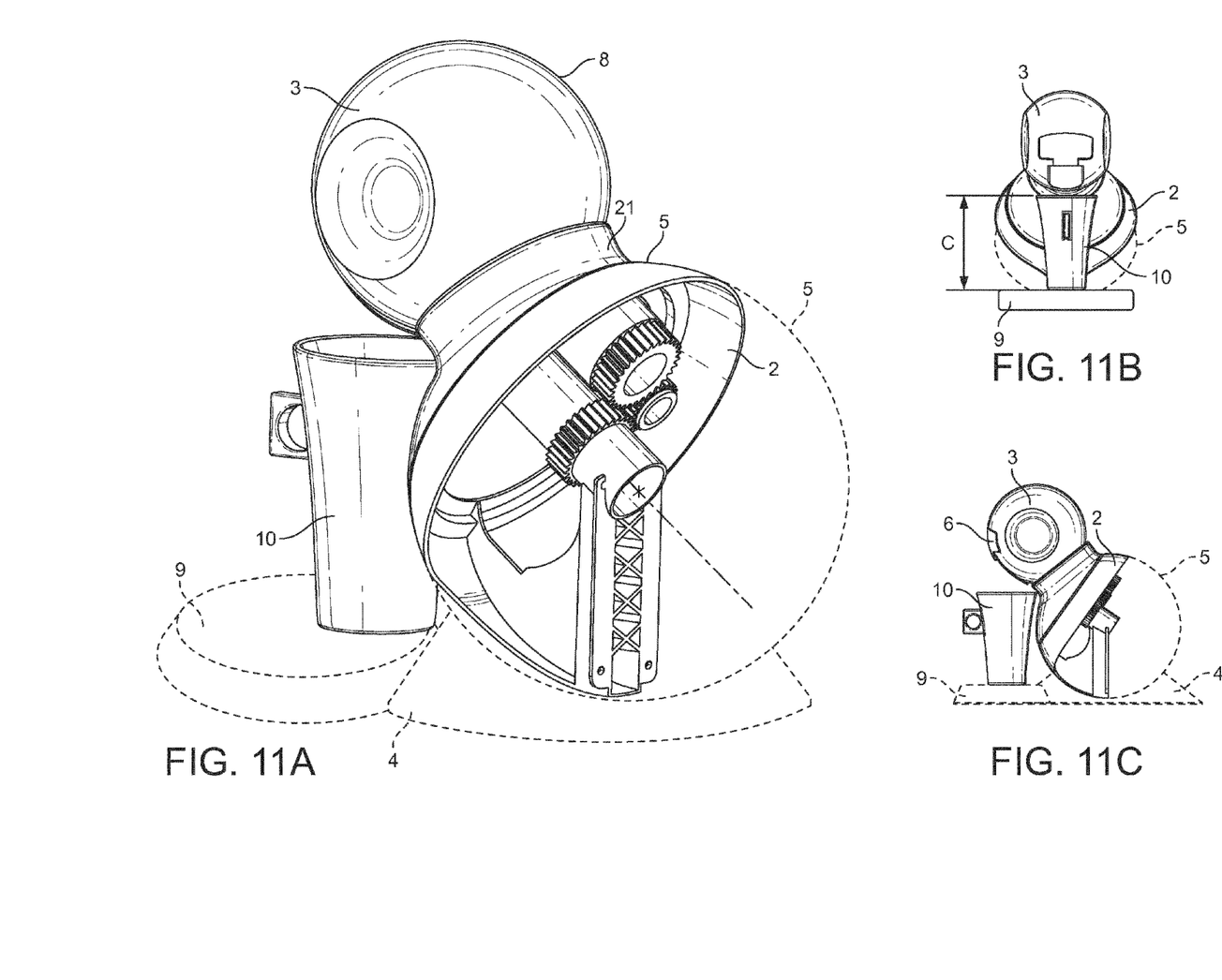
FIG. 11A is a partial perspective view of the embodiment shown in FIGS. 9A to 10C, wherein the head is in a position for dispensing a large cup volume of beverage.
FIG. 11B is a partial front view of a machine similar to FIG. 11A.
FIG. 11C is a partial side view of a machine similar to FIGS. 11A and 11B.

The machine head 3 can therefore be positioned by the consumer in different working positions, three of which are illustrated in FIGS. 9A to 11C. In FIGS. 9A to 9C, the machine head is set in a position for dispensing beverage into a small volume cup 10, such as an espresso or ristretto cup. In FIGS. 10A to 10C, the machine head is set to a position adapted to dispensing medium-sized volumes of beverages, like for instant cappuccinos. And in the FIGS. 11A to 11C, the machine head is positioned in its highest possible position, suitable for dispensing large cup volumes, for instance for preparation and dispensing large brew-like coffee cups or latte macchiatos.

Some other embodiments according to the present invention, which would guarantee a constant trim of the dispensing head relative to the machine body are listed hereafter—but are not described in greater detail in the present specification—:

simple wheels, without gear, which cooperate with one another in a similar way than that described above with reference to the first embodiment. The adherence between the different wheels is done by friction;

a belt mechanism that replaces the gear wheels described in reference to the first embodiment. The belt can cooperate with gear wheels, or non-gear wheels (by friction). According to one alternative, the belt is replaced by an equivalent such as a chain, or a system of connecting rods.

A constant trim of the capsule as it is guaranteed with the present invention, prevents messiness during dispensing. More precisely, the dispensing head of the machine is moved relative to the machine body, so that at the time the beverage flows out into a cup disposed below the outlet of the dispensing head, no liquid is projected or flows on the sides of the dispensing head. This would render the whole beverage preparation messy, and would require constant cleaning of the machine in the region of the dispensing outlet, which would of course be highly undesirable.

The material used for manufacturing the different parts of the machine, is preferably a plastic material, such as polystyrene, ABS for instance, or in metal (zamak or cast iron). Flexible parts can be made any suitable material such as natural or artificial rubber, silicone, etc.

Finally, in all embodiments of the present invention, the volume dispensed by the machine can be automatically adjusted by the machine, depending on the position of the dispensing head. Alternatively, the position of the dispensing head can be motorized and automatically adjusted at the correct height, depending on the size of the cup that is placed on the cup tray. The positions of the head can also be adjusted automatically depending on the type of capsule which is inserted inside the machine. For example, if an espresso capsule is inserted and a small cup is positioned on the cup tray, the machine head will automatically move to its lowest possible position, such that the dispensing opening of the machine or the capsule inserted therein is at a correct distance from the cup edge.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising a machine body and a machine dispensing head, the dispensing head and machine body comprising cooperating members that allow movement of the head relative to the body along a non-linear path, and such that the trim of the dispensing head is constant whatever its position, the cooperating members comprise cooperating gears with at least a movable gear wheel of the dispensing head, a stationary gear wheel of the machine body, and movable intermediate linking gear wheels, the centers of which are positioned on a lever element which is rotationally movable around the central axis of the machine gear wheel, and the gear wheels have identical gear wheel modules, and the pitch diameters of the dispensing head and machine body gear wheels, are identical.

2. The beverage preparation machine according to claim 1, wherein the movement of the dispensing head relative to the machine body follows an arc segment.

3. The beverage preparation machine according to claim 1, wherein the lever element forms at least part of the machine outer casing.

4. The beverage preparation machine according to claim 1, comprising a coding member associated with different positions of the dispensing head, the machine further comprising a sensor for sensing the coding member, the sensor being associated with a machine processor for setting a beverage dispensing volume value that depends on the position of the dispensing head.

5. The beverage preparation machine according to claim 4, wherein the machine processor is suitable for setting at least one other beverage preparation parameter selected from the group consisting of: dispensed beverage temperature, beverage preparation pressure, beverage preparation time, cleaning of the machine dispensing head, and combinations thereof.

6. The beverage preparation machine according to claim 4, wherein:
   the coding member is selected from the group consisting of: color surfaces, barcodes, recessed or protruding elements, RFID chips, magnetic surfaces, and printed characters; and
   the sensor is selected from the group consisting of: color sensors, barcode readers or linear CCD readers, mechanical switches or tactile sensors, RFID sensors, magnetic sensors or switches, and CCD camera.

* * * * *